Dec. 10, 1968 R. W. WARREN ET AL 3,415,263
FLUID LOW NOISE VORTICAL IMPEDANCE MATCHING DEVICE
Filed Sept. 13, 1966
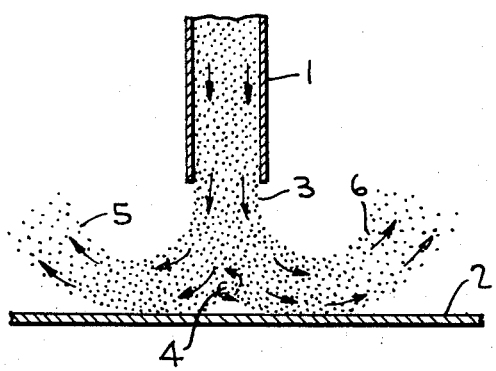
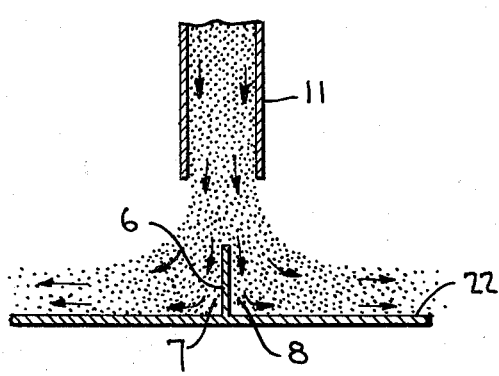
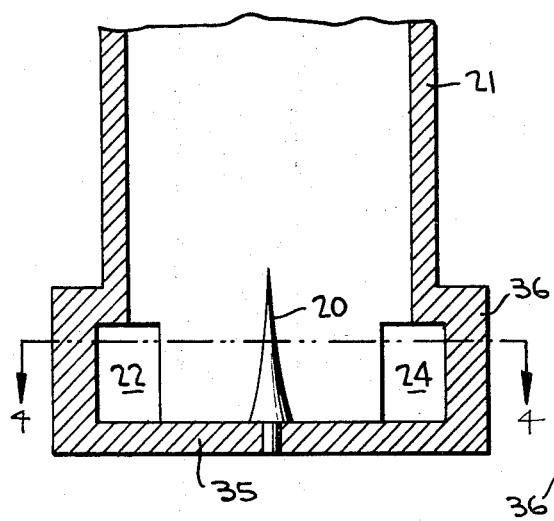
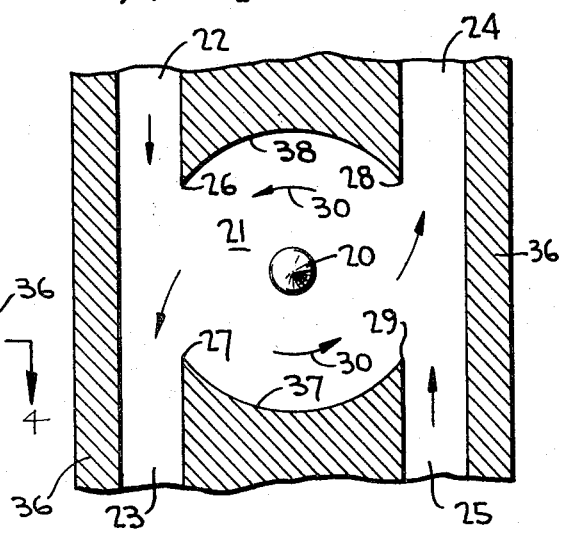
INVENTORS
RAYMOND W. WARREN
CARL J. CAMPAGNUOLO
LEONARD M. SIERACKI
Harry M. Saragovitz
Herbert Berl
Edward J. Kelly,
& J. D. Edgerton
ATTORNEYS United States Patent Office
3,415,263
Patented Dec. 10, 1968

3,415,263
FLUID LOW NOISE VORTICAL IMPEDANCE MATCHING DEVICE
Raymond W. Warren, McLean, Va., and Leonard M. Sieracki, Beltsville, and Carl J. Campagnuolo, Chevy Chase, Md., assignors to the United States of America as represented by the Secretary of the Army
Filed Sept. 13, 1966, Ser. No. 579,791
10 Claims. (Cl. 137—81.5)

This invention relates generally to a unit for providing the recovery of flow from a vortex without limiting the flow or adding undue noise thereto and has particular use in a pure fluid system.

Pure fluid systems have only recently been developed. These systems employ no moving parts and use only moving fluid to achieve functions such as amplification, oscillation and computer logic. Because of the absence of any moving mechanical parts, these systems have been designated by those working in the art as "pure fluid systems" and have in certain instances replaced mechanical systems which employed moving parts or electronic systems if the latter systems perform analogous functions to those which can be performed by a pure fluid system.

As is well known in the pure fluid systems and related arts, if a moving column of fluid meets an abrupt discontinuity in the system, the fluid flow will tend to become turbulent and will introduce noise in the system. An abrupt discontinuity may take the form of a relatively abrupt change of flow direction, caused, for example, by a right angle bend in a fluid passage or by an abrupt change of pressure between the passage in which the fluid flows and the pressure of the discharge region.

The present invention provides a smooth and quiet transfer of vortical flow to a tangential outlet or outlets. In an illustrative practice of the invention, a fluid stream is introduced at one end of a circular conduit in a manner to impart a rotational or vortical component of motion to the fluid. The fluid moves axially along the tube to the other end, retaining the vortical component of motion. At the other end, the fluid flows out of one set of tangential outlets if the fluid rotation is in one direction and out of another set of tangential outlets if the fluid rotation is in the other direction. If the fluid lacks a rotational component of motion it flows out of both sets of outlets. A spike positioned coaxially in the conduit in the region of the outlets provides smooth and quiet flow. Applicants have provided means to transfer vortical flow as smoothly and quietly as possible to tangential outlet conduits.

Broadly, therefore, it is an object of the present invention to provide a pure fluid vortex transfer system.

Another object of this invention is to provide means to quietly transfer a vortex to tangential flow.

Still a further object of this invention is to provide means to transfer vortical flow to tangential components with as little turbulence in the flow as possible.

Another object of the present invention is to use a pure fluid vortex transfer device to produce a push-pull output.

The above and still further objects, features and advantages of the present invention will become apparent upon consideration of the following detailed description when taken in conjunction with the accompanying drawings, wherein:

FIG. 1 illustrates flow against a flat plate;
FIG. 2 shows flow onto a spike prior to striking a flat plate;
FIG. 3 shows an open view of a pure fluid vortex transfer device in accordance with the present invention; and
FIG. 4 shows a cross-sectional view of the device of FIG. 3 taken on line 4—4 of FIG. 3.

In FIG. 1 conduit 1 is a fluid emitting source and is substantially perpendicular to flat plate 2. The fluid 3 issuing from the end of conduit 1 is characteristically uniform until a short distance 4 from flat plate 2. There, the flow pattern breaks up into two paths, 5 and 6, respectively. As can be clearly seen from FIG. 1, the flow will bounce back from plate 2 and in doing so will create considerable turbulence and noise.

FIG. 2 shows means to improve the flow against a flat plate. FIG. 2 is identical to FIG. 1 with the addition of spike 6. The spike improves the flow characteristics of fluid from conduit 11 against flat plate 22. Fluid issuing from conduit 11 is guided by spike 6 and attaches to the sides of the spike. As the fluid reaches the intersection of spike 6 and plate 22 at areas 7 and 8, respectively, the fluid is transferred from the sides of the spike to the flat plate 22 without any turbulence, noise or bounce back. This is because the spike guides the fluid attached to it to the plate without any free flow of the fluid. We have adapted the theory of flow against a flat plate to our pure fluid vortex matching device to improve the transfer of a vortex, which has a linear and rotational velocity component, to a tangential component.

In FIG. 3 conduit 21 is the part of the system that receives a fluid vortex. In the center of the conduit 21 and at its base 35 is spike 20 which can be attached to the base in a manner well known to the skilled mechanic. As can be seen from FIG. 3 the spike reaches just above outlets 22 and 24. Conduit 21 at its lowermost portion has a flange 36 to house fluid outlets, two of which can be seen in FIG. 3, 22 and 24, respectively. The flange 36 meets with base 35 to close the bottom of conduit 21. As shown in FIG. 4, a total of four outlet passages, of rectangular cross-sections, 22, 23, 24 and 25 are present in flange 36. Outlets 22, 25 and outlets 23, 24 are diametrically opposed while outlets 22, 23 and 24, 25, respectively, are in alignment with each other. The outlets are formed tangent to conduit 21 and are formed by separating the circumference of conduit 21 into sections 37 and 38, each section facing the other section and each section having adjacent thereto cusps 27, 29 and 26, 28, respectively.

In normal operation fluid having a vortical or rotational component of velocity is caused to flow into the top of conduit 21 in a manner well known in the art. If a flow is impressed at the top of conduit 21 which has no rotational component, the flow as it reaches the bottom of conduit 21 will divide equally into outlets 22, 23, 24, 25, respectively since there will be no tangential components of the flow to be selectively directed to certain outlets. Returning to the case of rotational flow, the fluid will travel down towards the base of conduit 21. As the vortex reaches spike 20 the fluid will be guided by the spike onto base 35 and into certain passages. Assuming that the fluid has a counterclockwise flow as seen in FIG. 4 the following results will occur. Since the fluid is rotating there will be a tangential component to the flow. For a counter-clockwise flow cusps 26 and 29 will prevent fluid flowing into passages 22 and 25, respectively, as these cusps will serve to guide the tangential velocity component of the vortex past their respective outlets. However, cusps 27 and 28 will not deflect the tangential velocity component of vortex from passages 23 and 24, respectively, and the fluid will flow into these respective passages. It is noted that as the fluid passes passages 22, 25, the fluid in these outlets will be entrained by the fluid flowing past cusps 26 and 29, respectively, and tend to create a pull on outlets 22 and 25 while the fluid flowing into outlets 23 and 24 will create a push, thus giving a push-pull outlet.

The corresponding operation for the case of clockwise vortical flow will be readily apparent and will be omitted.

It will be apparent that the embodiments shown are only exemplary and that various modifications can be made in construction and arrangement within the scope of the invention as defined in the appended claims.

We claim as our invention:

1. A fluid transfer vortex device comprising:
   (a) conduit means to receive a fluid vortex;
   (b) plural outlet means communicating tangentially with said conduit means;
   (c) means placed in said conduit means to guide the flow therein;
   (d) means to direct said vortex into selective outlet means;
   (e) said conduit having a base formed at the bottom thereof perpendicular to said conduit means; and
   (f) said means placed in said conduit means to guide the flow therein being a spike attached to said base.

2. A device according to claim 1 wherein:
   (a) said plural outlet means comprise at least a pair of fluid passages.

3. A device according to claim 1 wherein:
   (a) said plural outlet means comprises at least two pairs of fluid passages.

4. A device according to claim 3 wherein said pairs of passages are diametrically opposite each other.

5. A device according to claim 4 wherein one passage of each of said pair of passages is in alignment with one passage of said other pair of passages.

6. A device according to claim 5 wherein said one passage of each of said pair of passages is parallel to a passage in each of the other of said pair of passages.

7. A device according to claim 6 wherein said parallel passages are separated by a cylindrical section.

8. A device according to claim 7 wherein said means to direct said vortex into selective outlet means includes cusps on said cylindrical sections located adjacent said parallel passages.

9. A device according to claim 1 wherein:
   (a) said plural outlet means are at least a pair of passages; and
   (b) said means to direct said vortex into selective outlet means are cusps adjacent each of said passages.

10. A fluid transfer vortex comprising:
    (a) conduit means to receive a vortex;
    (b) plural passages communicating tangentially with said conduit means and perpendicular to the said conduit means, each passage being of rectangular cross-section and being formed by four walls;
    (c) a base attached to said conduit;
    (d) a spike attached to said base to guide the flow in said conduit;
    (e) a cylindrical section formed in a portion of said conduit; and
    (f) cusps formed by the intersection of said passage walls and said cylindrical section to selectively guide the flow into said passages.

References Cited

UNITED STATES PATENTS

| | | | |
|---|---|---|---|
| 3,171,422 | 3/1965 | Evans | 137—81.5 |
| 3,256,899 | 6/1966 | Dexter et al. | 137—81.5 |
| 3,311,120 | 3/1967 | Palmisano | 137—81.5 |
| 3,336,931 | 8/1967 | Fox et al. | 137—81.5 |
| 3,366,370 | 1/1968 | Rupert | 137—81.5 XR |

SAMUEL SCOTT, *Primary Examiner.*